United States Patent Office 2,975,742
Patented Mar. 21, 1961

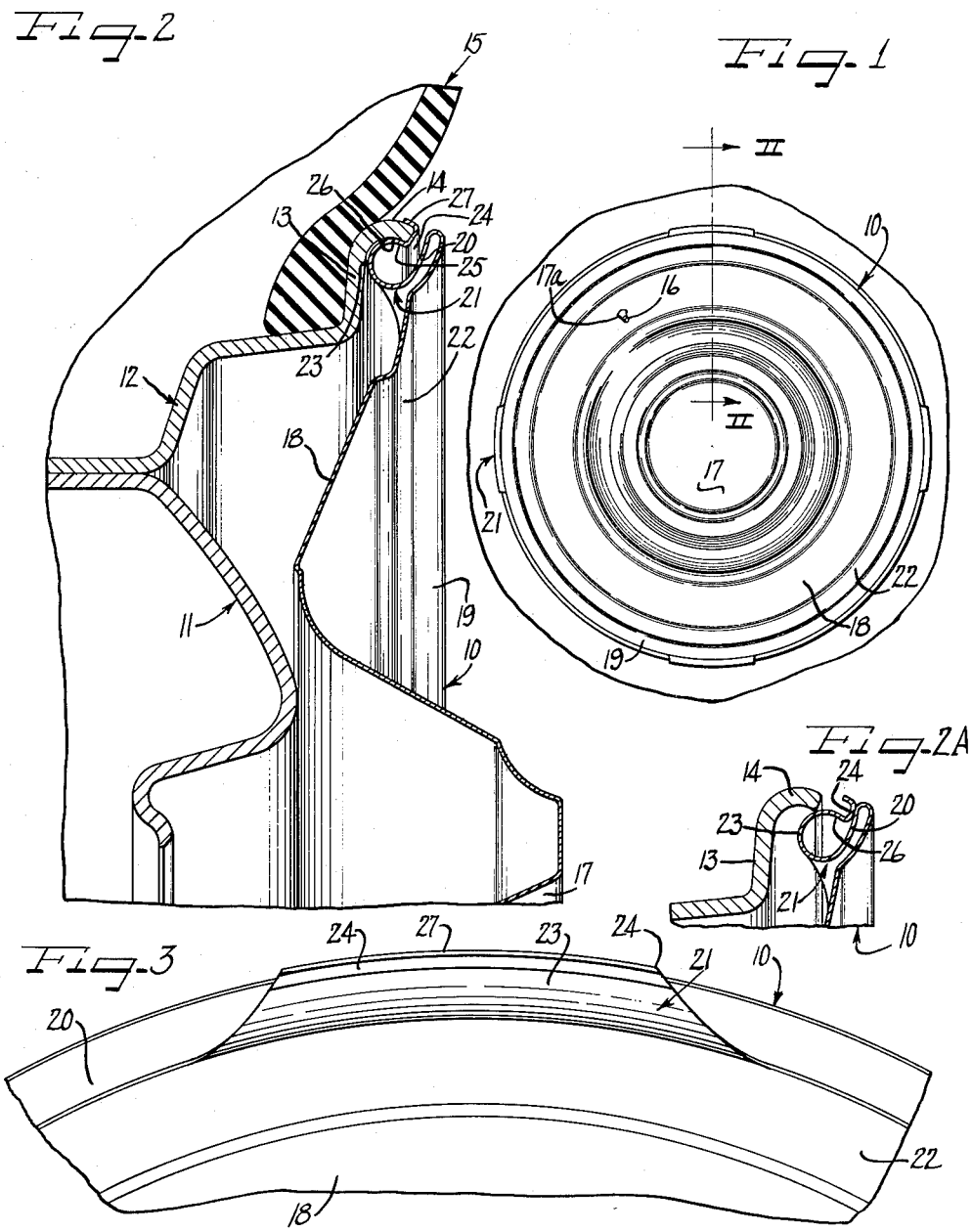

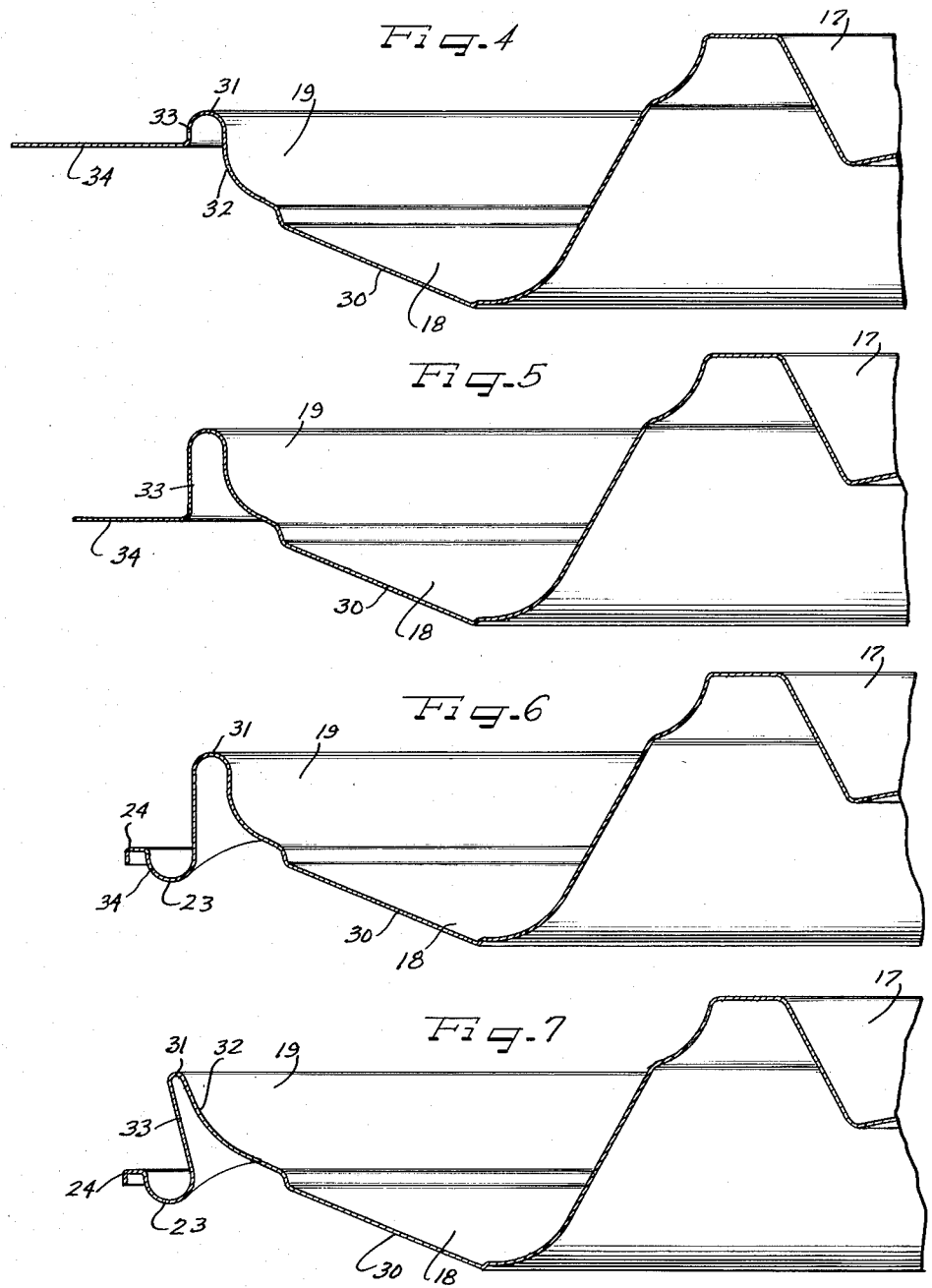

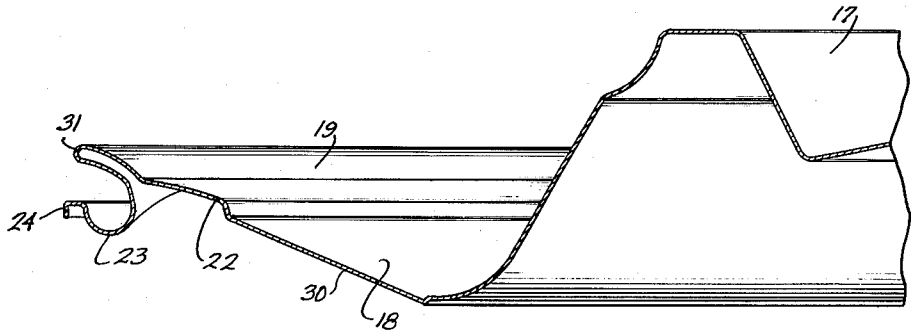
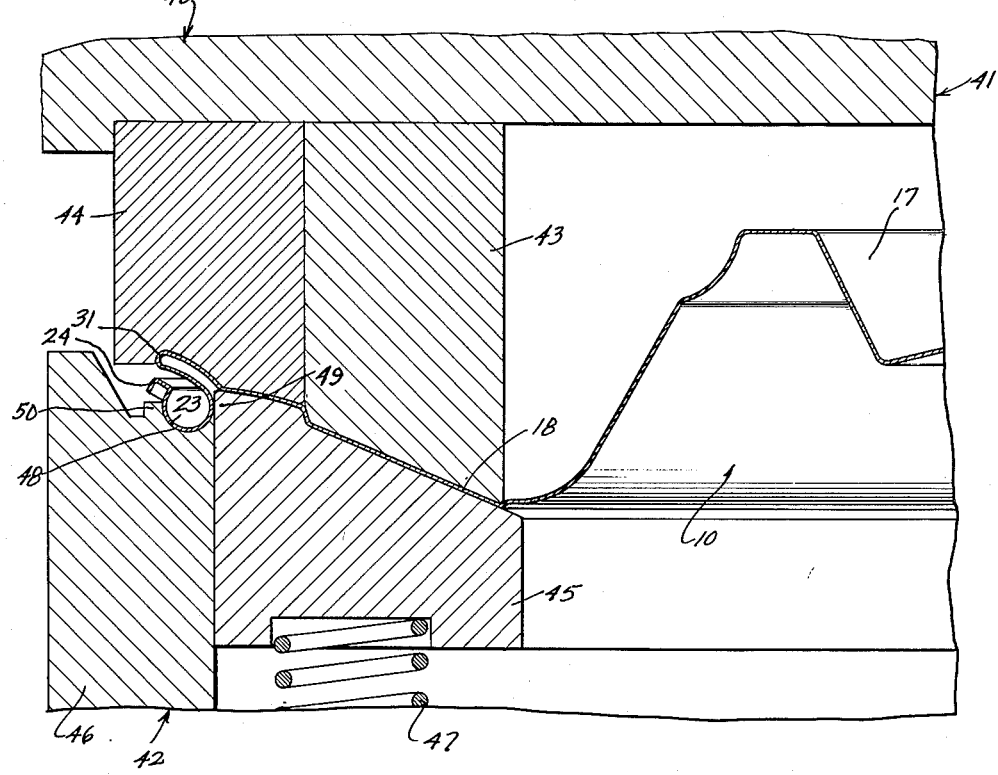
Inventor
GEORGE ALBERT LYON

2,975,742

METHOD FOR MAKING WHEEL COVERS

George Albert Lyon, 13881 W. Chicago Blvd., Detroit 28, Mich.

Original application Dec. 7, 1956, Ser. No. 626,852. Divided and this application July 1, 1957, Ser. No. 669,373

4 Claims. (Cl. 113—51)

The present invention relates to the manufacture of wheel trim or cover such as are adapted to be applied to the outer sides of vehicle wheels for ornamental and protective purposes.

This application is a division of my application Serial No. 626,852, filed December 7, 1956.

Still more particularly, the present invention relates to a new and improved marginal cover and retaining structure including the method for making same.

An important object of the present invention is to provide an improved method for making wheel trim or covers.

A further object is to provide an improved method of economically manufacturing wheel rings or covers on a large production basis.

Another object of this invention is to provide a novel method of making improved ornamental and protective covers for vehicle wheels of the type which can be easily and conveniently applied by manual pressure to the wheel and which may also be readily removed from the wheel without damaging the cover so that the cover may be again applied to the wheel with the cover retaining structure being as efficient as before in its manner of cooperation with the wheel.

Still another object of this invention is to provide a new and improved method for manufacturing a wheel cover with marginal retaining extensions having spring steel characteristics although the material from which the cover is made is merely stainless steel or other suitable metallic sheet metal not inherently possessed of spring steel characteristics.

Yet another object of this invention is to provide a new and improved method for manufacturing a wheel cover which is capable of effectively and efficiently maintaining itself upon a vehicle wheel and yet which lends itself to economical manufacture with a minimum cost.

Other objects and features of the present invention will more fully become apparent in view of the following detailed description taken in conjunction with the accompanying drawings illustrating therein a single embodiment and in which:

Figure 1 is a side elevation of my wheel structure;

Figure 2 is an enlarged fragmentary cross-sectional view taken substantially on the line II—II of Fig. 1 looking in the direction indicated by the arrows;

Figure 2a is a view similar to Figure 2 showing the action of the cover as it is applied to the wheel;

Figure 3 is an enlarged fragmentary rear elevation of my wheel cover;

Figures 4-8 are enlarged fragmentary cross-sectional views showing some of the steps by method of making a sheet metal blank into a wheel trim or cover member as is shown in Fig. 1; and Figure 9 is an enlarged fragmentary cross-sectional view showing apparatus for forming the cover shown in Fig. 8 into final form which cover is also shown in Fig. 2.

It is believed that my novel method and apparatus can be best understood by first describing an article that is produced thereby and the following detailed description initially describes the article, then the method, and finally the apparatus.

A wheel cover 10 (Figs. 1–3 and 9) according to the present invention is constructed and arranged to be applied and press-on, pry-off relation to the outer side of a vehicle wheel which may be of the conventional type having a disk spider wheel body 11 carrying a multi-flange drop center tire rim 12 which rim has a generally radially outwardly extending flange 13 terminating in and merging with a curled terminal flange 14. The body part 11 is adapted to be bolted into the axle of a vehicle in a conventional manner such as by directing lugs through openings in the body part 11 and thereafter threading nuts onto the lugs to clamp the body part to the axle.

The tire rim is adapted to support a pneumatic tire and tube assembly, or a tubeless tire 15 as is shown in Figure 2. For inflating the tire, the tire is provided with a valve stem 16 which extends through cover opening 17a as is shown in Fig. 1 so as to be accessible from the outer side of the wheel.

The wheel cover 10 comprises a one piece sheet metal stamp and drawn circular body having a central crown portion 17 for overlying a central portion of the wheel body 11 and merging with an intermediate annular inwardly dished portion 18 from which extends generally radially and axially outwardly an outer annular marginal portion 19 for overlying the tire rim 12.

New and improved means are provided for press-on, pry-off retention of the cover 10 on the wheel. To this end, the outer marginal portion 19 of the cover has an underturned generally radially and axially inwardly extending continuous flange 20. Extending generally axially inwardly from the flange 20 at circumferentially spaced intervals are reverse bent resiliently deflectable retaining extensions 21.

It will be noted the outer marginal portion 19 and the continuous annular flange portion 20 are in close axial proximity to one another and are more or less concentrically arranged. To augment and stiffen the outer margin of the cover, an annular rib 22 is provided at the junction of the portions 18 and 19. The retaining means 21 includes generally radially extending curled portions 23 and 24. The curled portion 23 is larger than curled portion 24 and opens axially outwardly while the curled portion 24 opens axially inwardly. Generally at the junction of the curled portions 23 and 24 is provided an annular wheel engaging surface 25 which is adapted to retainingly engage behind the shoulder provided by the curled rim flange terminal 14.

The outer curled portion 24 includes angularly related flanges 26 and 27 (Fig. 3). These flanges 26 and 27 are adapted to nestingly engage with the tip of curled terminal rim flange 14 so as to resist axial inward deflection of the cover to minimize the effect of curbing and to resist damage to the retaining means.

These flanges 26 and 27 also serve to maintain the looped portion 23 in axially spaced relation to the radial rim flange 13.

The cover may be assembled upon the wheel by initially aligning the valve stem 16 with respect to the cover opening 17a and thereafter urging the cover axially inwardly in abutting engagement with the rim 12 (Figure 2a) with the result that the curled portion 23 is progressively radially inwardly deflected by the radially inner outer edge of the curled terminal rim flange 14 until the outer looped portion 24 is in abutting engagement against the cover flange 20. Force may be then applied through the cover margin 19 directly to the curled portion 24 to urge the surface 25 into biting engagement behind the shoulder provided by the rim flange 14. At this point, the tip of the rim flange 14 is engaged on three sides in the recess defined by the axially inwardly opening curled portion 24.

To effect removal of the cover 10 from the wheel, a suitable pry-off tool may be inserted underneath the cover 10 and upon the application of a pry-off force the cover may be pried from the wheel.

The cover 10 may be made from sheet brass of a suitable alloy or sheet steel, more especially stainless steel of suitable type, and may be worked and formed by stamping and drawing operations. It is contemplated that suitable sheet aluminum may also be used. All of these materials are cold work hardenable and will take a high lustrous polish, while the brass may be nickel plated and the stainless steel may be readily flash chrome plated. Moreover, in the cold working of the cover retaining means as well as the outer marginal looped cover portion defined by the flanges 19 and 20, a high degree of resiliency is attained which is quite advantageous for embodying efficient retaining gripping characteristics in the retaining extensions 21.

According to my method and as is shown in Fig. 4, the cover is initially blanked and formed with radially inner and outer ribs 30 and 31. The inner rib 30 defines an annular axially outwardly opening trough-like channel and which rib is directed axially inwardly. The outer rib 31 is generally U-shaped and has inner and outer legs 32 and 33. Inset relative to the rib 31 and connected at the axially inner end of the leg 33 is a generally radially outwardly directed flange structure or flat flange 34. Since the cover retaining means may be formed out of the material at the four corners of a cover blank, the flange 34 need not be continuous.

The next step in the formation of my cover 10 takes place as is shown in Fig. 5 when the flange 33 is wiped axially downwardly with the result that the flat flange 34 is reduced in its radial length or dimension.

The next step in my method is shown in Fig. 6 wherein the radially outwardly directed flange structure 34 is reverse bent or upset to provide axially outwardly and axially inwardly opening looped portions 23 and 24. The radially inner looped portion 23 has a larger cross-sectional looped configuration than the looped portion 24.

After the looped portions 23 and 24 have been formed to preliminary shape, the rib 31 is collapsed (Figure 7) in a generally radially and axially outwardly extending direction in such a manner that the distance between the legs 32 and 33 of the rib 31 is reduced.

As is shown in Fig. 8, the collapsing of the rib 31 is a progressive operation and is completed when the junction between the looped portions 18 and 19 is formed with a reinforcing rib 22. It is in this manner that the rib 31 may be collapsed so as to extend generally in a radial direction and yet be reinforced due to the cold working of the metal in the formation of the ribs 22 and 31.

After the cover blank has been worked to the state as shown in Figure 8, the cover blank is in proper condition to be placed in my novel apparatus indicated generally by the reference numeral 40 in order to form the cover to final shape. To this end, the apparatus functions to further curl the curled portion 23 to bring the curled portion 24 in close proximity to the underturned cover margin.

The apparatus 40 includes upper and lower die members 41 and 42. The upper die member carries a pair of radially abutting annular hold down members 43 and 44 which members have an irregularly configurated surface which is adapted to conform with the outer surface of the cover blank as is shown in Figures 8 and 9.

The lower die member 42 is comprised of radially abutting members 45 and 46 which are preferably annular in construction. Die member or pad portion 45 is mounted on a spring element 47 so that with the lowering of the upper die member 41 the member 45 is moved resiliently downwardly while the retaining means is being further worked. After the retaining means has been worked to shape, and the upper die member 41 has been moved away from the lower die member 42, the spring 47 returns the die member of portion 45 to a raised or elevated position with respect to the position shown in Fig. 9.

The outer annular die portion 46 is grooved to provide a curling groove 48 which is bounded on its radially inner and outer sides by radially spaced abutments 49 and 50. It will be noted, the abutment 49 is located on the die portion 45 and that the abutment 50 has angularly related edge surfaces of a configuration conforming generally to the recess defined by the looped portion 24.

As the die members 41 and 42 are brought together the loop portion 23 is further curled with the result that the outer looped portion 24 is brought into closer proximity to the marginal rib 31 thereby cold working the retaining means to final shape.

As a result of practicing my new method, a reinforced cover structure may be provided such that the original stainless steel sheet will be rendered work hard to an extent sufficient to provide a reinforced cover margin and retaining means having sufficient resiliency so as to lend themselves to continuous use with a vehicle wheel even though the cover is removed and reapplied a large number of times.

Where preferred, the cover may be provided instead of four retaining extensions integrally in one piece therewith, with different numbers of retaining extensions as is desired.

It will be understood that modifications and variations may be effected without departing from the scope of the novel concepts of the present invention.

I claim as my invention:

1. In a method of making wheel trim or cover, the steps of drawing a sheet metal blank to provide a body having an annular axially outwardly opening trough-like channel defining an axially inwardly directed rib and a radially outer narrow hollow rib-like channelled section opening rearwardly and projecting generally axially outwardly at the radially outer side of the first mentioned channelled rib and with a radially outwardly directed flange structure on the radially outer wall or leg of the radially outer rib-like channelled section and inset relative to the outer rib-like channelled section, upsetting and curling the radially outwardly directed flange structure forming consecutive axially oppositely opening channelled portions, and flattening and collapsing the radially outer rib-like channelled section radially outwardly while curling the inner channelled portion thereby swinging the outer channelled portion in closer proximity to the radially outer rib-like channelled section.

2. In a method for forming retaining means at the outer margin of a dished wheel cover having an annular U-shaped hollow rib at the margin and a relatively flat flange portion extending away from the rib, the steps of working and elongating a radially outer leg of the U-shaped rib while reducing the length of the relatively flat flange portion, reverse bending the reduced flange portion, and cold working the hollow rib by turning the same generally radially outwardly into axially overlying and concealing relation with respect to the reverse bent flange portion.

3. In a method of forming retaining means at the outer margin of a dished wheel cover having an annular fold at the margin thereof and a flat flange portion extending radially away from the fold, the steps of reverse bending the flange portion, flattening and reducing the distance between the legs of the fold while bending the fold generally radially outwardly, and curling the reverse bent flange portion while bringing the flange portion in closer proximity to the fold.

4. In a method of making a wheel cover, the steps of forming a sheet metal blank into generally cup-shape with a generally outwardly extending marginal flange formation and a body portion joining the marginal flange formation on a curved juncture, reverse bending the radially outwardly extending marginal flange formation forming successive larger and smaller radially inner and radially outer curled portions, deflecting the extremity portion of the fold radially outwardly, and curling the radially inner curled portion drawing the smaller radially outer curled portion into closer proximity to the fold.

References Cited in the file of this patent

UNITED STATES PATENTS

| | | |
|---|---|---|
| 2,282,588 | Lyon | May 12, 1942 |
| 2,674,787 | Lyon | Apr. 13, 1954 |
| 2,689,539 | Lyon | Sept. 21, 1954 |
| 2,707,449 | Lyon | May 3, 1955 |
| 2,761,408 | Lyon | Sept. 4, 1956 |